United States Patent [19]

Libsch et al.

[11] 4,115,109

[45] Sep. 19, 1978

[54] SECONDARY LEAD SMELTING PROCESS

[75] Inventors: Karl David Libsch, Hightstown; Mannige Vikram Rao, Princeton Junction, both of N.J.

[73] Assignee: N L Industries, Inc., New York, N.Y.

[21] Appl. No.: 842,983

[22] Filed: Oct. 17, 1977

Related U.S. Application Data

[63] Continuation of Ser. No. 678,954, Apr. 21, 1976, abandoned.

[51] Int. Cl.$^2$ ............................................. C22B 13/02
[52] U.S. Cl. ........................................ 75/77; 75/24; 75/25
[58] Field of Search ................. 75/77, 24, 25

[56] References Cited

U.S. PATENT DOCUMENTS

| | | | |
|---|---|---|---|
| 3,243,283 | 3/1966 | Lumsden | 75/77 |
| 3,451,806 | 6/1969 | Cogen et al. | 75/77 |

*Primary Examiner*—M. J. Andrews
*Attorney, Agent, or Firm*—Gerald K. White; Malcolm L. Sutherland

[57] ABSTRACT

A process for producing metallic lead from lead battery plates and other types of lead scrap in a secondary lead smelting operation has been developed which comprises adding from 1% to 8% moisture and 0.5% to 5% oxygen to the air which is used to react with carbonaceous material such as coke to maintain the temperature in the melting region from about 1100° C. to about 1300° C. The moisture is added to the air to react with the coke to form carbon monoxide and hydrogen, and the oxygen is added to maintain the temperature in the melting zone. Increased amounts of lead are produced using smaller quantities of coke and iron when the moisture and the oxygen are added to the air.

4 Claims, No Drawings

SECONDARY LEAD SMELTING PROCESS

This is a continuation of application Ser. No. 678,954, filed Apr. 21, 1976, now abandoned.

BACKGROUND OF THE INSTANT INVENTION

Most of the metallic lead has been produced in the past by reduction of lead ores and ore concentrates. The most abundant of the lead ore sources are sulfide ores, most of which contain zinc sulfide as a major impurity. These ores and ore concentrates are normally roasted to produce oxygen containing compounds such as lead oxides and lead sulfates. These lead compounds are then added to a lead blast furnace and the lead values are smelted to produce molten lead. The presence of zinc as an impurity in these ores and concentrates requires the use of more complicated processing steps and to the use of more reducing agent in order to obtain a high recovery of the lead values.

A typical innovation in the primary process for smelting lead sulfide ores and concentrates containing zinc sulfide as a major impurity is described and patented by John Lumsden in U.S. Pat. No. 3,243,283 issued Mar. 29, 1966. In the patent, Lumsden describes the operation of primary lead blast furnace wherein the sulfides are converted to oxides prior to charging in the furnace. Carbon monoxide produced from the combustion of coke reduces the lead oxides to lead near the top of the shaft. This reaction is exothermic. When zinc is present in the charge, zinc oxide is also reduced to zinc by carbon monoxide, and the zinc vapor in turn reduces lead oxide, this reaction being very exothermic. The two exothermic reactions raise the temperatures to a degree such that premature melting occurs of some of the charge components near the top of the shaft, followed by resolidification somewhat lower in the shaft, leading to bridges and hangs.

In order to overcome this difficulty, Lumsden proposes controlling the temperature in the upper portions of the shaft by the addition of steam and preheated air at the bottom of the furnace. In conventional primary smelting practice, the temperature is controlled by the addition of large quantities of returned slag, which act as a heat sink. A typical primary furnace taps an amount of slag at the bottom in excess of the amount of lead bullion produced. Lumsden teaches techniques for the control of steam addition in such a way as to prevent hangs even with the use of less return slag. He further suggests that the use of at least 4% steam in the air blast preheated to at least 200° C. is needed to arrive at the benefits of reduced hangs and decreased coke consumption.

Since one of the largest uses of lead is in the battery industry, the recovery and reuse of lead from batteries and battery scrap is an absolute necessity. One such process for recovery and reuse of lead is called a secondary lead smelting or blast furnace operation.

In contrast to primary lead smelting, the secondary lead blast furnace uses a charge containing substantial quantities of sulfur compounds, such as metal sulfides and sulfates, the chief source being the battery scrap and by-product drosses. Thus, considerable quantities of cast iron are used to reduce these sulfur compounds. Iron also reduces a portion of the lead oxide to lead. Some of the iron oxidizes to form a major constituent of the slag. Thus, iron plays a very central role in the secondary blast furnace. The charge also contains quantities of lead metal (generally alloyed with antimony) in the form of battery grids. In the secondary furnace the smelting zone appears to be lower than that postulated by Lumsden as being the case in the primary furnace.

Very small quantities of slag are added to the charge and often no slag is used at all. Typically, in a secondary blast furnace the slag tapped out of the bottom is less than 20% of the weight of the lead produced. Substantial quantities of matte are produced, however, these being predominantly composed of iron sulfides, typical quantities being 30% of the weight of lead produced.

In the instant invention, steam and oxygen are added to the air, resulting in decreased coke use, decreased iron use, and increased lead production. The air does not have to be preheated. The endothermicity of the steam reaction with coke is counteracted by the higher flame temperature of the coke combustion due to the oxygen enrichment of the combustion air. The role of steam in reducing coke use is readily understood by the fact that the reaction of steam with coke produces hydrogen which is a more effective reducer of lead oxide than is carbon monoxide. The mechanisms by which iron consumption is reduced are not understood in their entirety, although it is clear that the hydrogen does, in some complex fashion, affect the role of iron in its three functions, namely, 1) reduction of lead oxide, 2) oxidation to iron oxide in some other fashion to form a slag constituent, and 3) most importantly, reaction with the sulfur compounds to form iron sulfide, which is the principal component of matte.

The instant invention is primarily concerned with this type of lead recovery process.

SUMMARY OF THE INVENTION

The instant invention comprises an improvement in a secondary lead smelting operation in which lead metal is recovered from battery plates and scrap which contains both lead metal and lead metal compounds. The smelting operation is carried out by charging the smelter with the battery plates and scrap along with carbonaceous material such as coke, iron and fluxes and passing air through the smelter to react with the coke to produce carbon monoxide and to obtain and maintain a temperature of from about 1100° C. to about 1300° C. in the melting region. This carbon monoxide reduces the lead compounds to metal and the temperature makes possible the melting of the slag, matte and lead. Sufficient iron is added to reduce the metal sulfide compounds to metal and to produce iron oxide for fluxing, a typical operation requiring 300 lbs. iron per ton lead produced. In this process the improvement comprises providing from 1% to 8% moisture in the air to react with the coke to produce carbon monoxide and hydrogen and simultaneously adding oxygen to the air in amount of 0.5% to 5% to maintain the temperature in the melting region.

Adding moisture and oxygen to the air improves the efficiency of smelting and thereby reduces the coke and iron consumption and increases the rate of production of lead metal.

The decreased coke consumption can be attributed to the fact that whereas the reaction of a mole of coke with oxygen in air produces only one mole of carbon monoxide, that with moisture produces one mole of hydrogen in addition to one mole of carbon monoxide, both of which can reduce lead oxide. Thus, a more efficient use of coke results from the injection of steam. Oxygen enrichment of the air is necessary to counteract the endothermic effects of the steam reaction with coke.

The decrease in iron consumption has been observed in testing and one can only speculate on the mechanism. Iron undoubtedly is thermodynamically capable of reducing lead oxide. The exact extent to which it successfully competes with carbon monoxide in reducing lead oxide is not known. However, hydrogen, being a more effective reducer than carbon monoxide, can be expected to affect the lead oxide reduction role of iron. It might also affect the matte formation role of iron through interfering with the mechanism of iron transfer between matte and slag.

The increased production rates can be attributed to the faster throughput rates due to the decreased coke and iron usages, and also to the generally improved smelting conditions produced such as (1) the increased smelting efficiency of hydrogen as compared to carbon monoxide, (2) the more uniform temperature profiles that can be expected to prevail in the shaft and (3) the lower top gas temperatures.

DESCRIPTION OF THE PREFERRED EMBODIMENTS

In carrying out a secondary lead operation in a conventional shaft-type furnace, it is customary to feed incremental charges of battery scrap lead and lead compounds into the top of the shaft furnace along with other constituents such as limestone, sand, scrap iron, by-product drosses, slags and coke as the operation proceeds.

The charge contains small amounts of non-reducible oxide, sulfur compounds and small amounts of other metals such as antimony, copper and the like. Fluxes such as limestone and silica are added to react with iron oxide and the non-reducible oxides to form a low melting slag. Iron is added to form iron oxide and to react with the sulfur compounds to form iron sulfide which is finally present in the matte. Both the slag and the matte are removed in a molten state from the furnace. The lead metal produced often contain small amounts of the other metals mentioned above.

A typical charge has a total weight of about 7200 lbs. of lead bearing constituents such as battery plates, reverberatory furnace slag, refining and other by-product drosses, returned flue dust and battery manufacturers scrap. The coke and iron vary with the proportions of the constituents in the foregoing. For example, when a higher proportion of sulfide drosses are present, a greater quantity of iron will be necessary to fix the sulfur. Increased iron will also be required when battery plates freshly cut out of the casing are used, since a greater proportion of sulfuric acid can be expected to be present in this case as opposed to the case of plates subjected to rain water leaching and other weathering operations.

A typical charge, such as for example the one in Example 1, would have the following proportions: 3600 lbs. battery plates, 1400 lbs. lead compound scrap, 1000 lbs. returned flue dust, 1200 lbs. by-product drosses, 90 lbs. silica sand, 110 lbs. lime, 800 lbs. returned slag, 120 lbs. shredded steel, 425 lbs. cast iron and 330 lbs. coke. The amount of steel and iron added is sufficient to produce iron oxide for the slag and to reduce the sulfide compounds to metal. One could expect in the neighborhood of 30 charges to be made in a 24 hour day.

Fluxes are added in amount to dilute the high melting, nonreducible oxides to about 10-20% of the slag weight, and in so doing optimize upon the following properties: 1) low melting point for ease of fusion and removal, 2) low density for ease of separation from the matte layer, 3) low viscosity to enable the lead droplets to sink with a minimum of entrapment, 4) slag neutrality and 5) high activity coefficient of PbO in the slag in order to have a minimum of dissolved PbO under any given reducing conditions. Desirable slag compositions based upon the above are in the immediate vicinity of 25–50% FeO, 5–20% CaO and 20–40% $SiO_2$, the other 10–20% being composed essentially of the nonreducible oxides. When the sum of the three major constituents deviates significantly from 85% of the total slag, changes in fluxing components are made accordingly to reduce or increase the proportions of the CaO, $SiO_2$ and FeO present.

Care should be taken during the operation to see that the furnace is neither overcoked nor undercoked.

Zinc is not present (or at most, present in minimal amounts) in the feed materials in secondary lead smelting operations and therefore there are no difficulties to overcome in handling zinc as an impurity.

When a secondary lead smelting operation is carried out in the absence of moisture, the air reacts with carbon in the coke to produce carbon monoxide and carbon dioxide. The former reduces the lead oxides to lead.

However, when moisture is present in the air, according to the instant invention, the reaction between water and carbon occurs, producing carbon monoxide and hydrogen. The hydrogen produced is a much more efficient reducer of lead oxide than carbon monoxide. This is shown by the fact that virtually all of the hydrogen produced is consumed in the furnace while only a portion of the carbon monoxide produced is consumed by the prior processes.

The oxygen is added to the air in order to provide a higher flame temperature upon combustion with coke, in order to counteract the endothermicity of the reaction of the moisture with the coke.

One criterion which was used for estimating the oxygen enrichment required during the plant tests, and one to be used in actual practice, was the temperature of the lead as it emerged out of the lead well. This temperature should be taken when the lead is flowing in a continuous stream, and always at the same time relative to the instant of tapping the slag. This temperature is a good relative measure of the temperature in the melting zone. Actually, lead well temperatures in the range 880° to 925° C. were sought to be maintained by adjustment of the oxygen enrichment.

In order to describe the instant invention in more detail the following examples are presented:

EXAMPLE 1

In this example a secondary lead smelting operation was actually carried out as follows:

Incremental charges of various ingredients were added into the top of the furnace to form layers in the furnace bed. These ingredients included scrap iron, limestone, silica sand, slag, coke and the recycled lead bearing products. The lead bearing portion of each charging cycle consisted of the following ingredients:

| Ingredients | Pounds |
| --- | --- |
| Battery Plates | 3600 |
| Lead Compound Scrap | 1400 |
| Returned Flue Dust | 1000 |
| By-Product Drosses | 1200 |

2.0% moisture and 1.0% oxygen were added to the air which was to be used in the smelting operation.

1580 scfm of the air containing the oxygen and the moisture were introduced at the bottom of the furnace which passed up through the charge to react with the coke in order to produce hydrogen and carbon monoxide. The hydrogen and carbon monoxide reduced the lead compounds to metal and the oxygen and the air reacted with the coke to maintain a temperature high enough (i.e. from 1100° C.–1300° C.) to melt the slag and matte and to form molten lead metal.

Adjustments in iron additions were made so as to ensure complete reduction of the sulfur compounds. The conditions of the lead well and the slag/matte tap were used as determinant criteria. The same criteria were utilized to ensure that a potentially hazardous high iron condition was not encountered. Lime and silica additions were adjusted such that approximately 85% of the slag was composed of iron oxide, lime and silica, and such that their proportions were in the vicinity of 35–40% FeO, 10–20% CaO and 25–35% $SiO_2$. The slag/matte was tapped at intervals of 15–20 minutes, based primarily upon visual observation through the tuyeres.

It was discovered that all of the hydrogen formed was utilized to reduce the lead compounds to metal. Typically, the hydrogen in the top gas was in the neighborhood of 0.15%. A similar figure was obtained during the control run as well.

The operating details and the results obtained are compared and recorded in the Table along with the control run which contained no moisture and oxygen additions to the air.

CONTROL RUN A

In this run the procedure described above was repeated except that neither moisture nor oxygen were added to the air introduced into the furnace.

In this run, therefore, the air reacted with the coke to produce carbon monoxide and carbon dioxide. Carbon monoxide in the top gas was typically in the range 1.5% to 3.5%, which was similar to that obtained in Example 1.

Again the operating conditions and results obtained are recorded in the Table.

When the moisture and oxygen were added to the air employed in the smelting operation, the following benefits were obtained: (1) the production of lead metal was increased by 24%, (2) lower top gas temperatures were observed, (3) the coke and iron necessary for the smelting operation were decreased 10.7% and 14.7%, respectively. The average coke usages in Example 1 and Control Run A were 125 and 140 lbs. per ton of Pb, respectively. The average iron usages in Example 1 and Control Run A were 308 and 361 lbs. per ton of Pb, respectively.

EXAMPLE 2

In this run the procedure of Example 1 was repeated using the lead bearing ingredients per charging cycle as follows:

| Ingredients | Pounds |
| --- | --- |
| Battery Plates | 4400 |
| Lead Compound Scrap | 1600 |
| Returned Flue Dust | 1000 |

| Ingredients | Pounds |
| --- | --- |
| By-Product Drosses | 200 |

In carrying out this run 1.8% moisture and 1.8% oxygen were added to the air. The air containing the moisture and the oxygen was added to the bottom of the furnace as described above.

The operating details and results obtained are recorded in the Table.

CONTROL RUN B

The operating conditions of Example 2 were repeated except that neither moisture nor oxygen were added to the air. The results are also recorded in the Table.

Again the lead recovery of Example 2 is higher than the lead recovery of Control Run B. This shows that the addition of moisture and oxygen to the air results in an improved lead recovery.

In both examples, factors that stayed substantially unchanged were the average operating back pressure and the lead values in slag. Furthermore, the hydrogen concentration in the top gases was the same during Example and Control runs indicating that essentially all the hydrogen produced in the reaction of moisture with coke was consumed in the furnace. In Example 2 and Control B, the amounts of iron and coke were similar to those used in Example 1 and Control A.

The Examples demonstrate the benefits obtained from the injection of steam and oxygen to the air blast. The steam additions in the Examples were 2.0% and 1.8% while the oxygen was varied from 1.0% to 1.8%, respectively. The charge in Example 1 was such as to produce a hotter furnace than that in Example 2. Consequently, a lesser proportion of oxygen was needed in Example 1 to maintain the desired temperatures in the melting region.

Prior to actual plant testing of the concept of moisture oxygen injection, confidence in the nature of results to be expected was achieved by the use of a computer model. This model simulates the action of a secondary lead blast furnace. Computer runs estimated the effects of the addition of differing levels of moisture and oxygen to the combustion air stream.

The charge used in the computer calculation was similar to that in Example 2. For this case oxygen injection at the 1.5% level was computed as necessary for maintenance of proper temperatures in the tuyere region. This compares favorably with the 1.8% actually found necessary in Example 2. The charge in Example 1 was expected to require a lower amount of oxygen, and such was found to be the case. The computer model further predicted coke savings of 21% and production rate increases of 19%. It also predicted lower top gas temperatures, more uniform temperature profiles in the shaft, both partly due to more effective transfer of heat from the rising hot gases to the downcoming charge.

Given the semi-quantitative nature of the findings to be expected from such a model (the primary limitation being lack of accurate data), the results obtained in Examples 1 and 2 were in remarkable concurrence with the findings of the model. From this work it was determined that the moisture may be varied from 1% to 8% and the corresponding oxygen from 0.5% to 5%.

At higher levels, greater quantities of hydrogen would be produced which would lead to improved efficiencies, such as decreases in iron and coke consumption and further increases in production rate. However, at the higher levels of steam and oxygen, the decreases in coke and iron necessary to ensure that an over reduced condition does not prevail, could well lead to a drastic reduction in thickness of the coke bed, resulting in loss of structural functions required of a coke bed.

It has been found that the preferable range of steam addition is about 1–5% while the oxygen is about 1–3%.

While this invention has been described and illustrated by the examples shown, it is not intended to be strictly limited thereto, and other variations and modifications may be employed within the scope of the following claims.

TABLE

|  | Example 1 | Control A | Example 2 | Control B |
|---|---|---|---|---|
| Air Added to Furnace (scfm) | 1580 | 1580 | 1580 | 1580 |
| Average Back Pressure (ins.) | 30 | 30 | 24 | 29 |
| Moisture Added to Blast Air (%) | 2.0 | 0 | 1.8 | 0 |
| Oxygen Added to Blast Air (%) | 1.0 | 0 | 1.8 | 0 |
| Lead Production Rate (tons/day) | 86 | 69 | 90 | 79 |

We claim:

1. In a process for producing lead in a secondary lead smelter which comprises charging said smelter with lead bearing material, carbonaceous material, iron, and fluxes; passing air through said smelter to react with said carbonaceous material to produce carbon monoxide and thereby melt and reduce said lead bearing materials and form molten lead; and removing said molten lead from said smelter, wherein the improvement comprises adding from about 1% to 8% moisture by weight and from about 0.5% to 5% oxygen by weight to said air prior to passing said air through said smelter.

2. The process of claim 1, wherein: the amount of moisture added to said air is from about 1% to 5% by weight.

3. The process of claim 1, wherein: the amount of oxygen added to said air is from about 1% to 3% by weight.

4. The process of claim 2, wherein: the amount of oxygen added to said air is from about 1% to 3% by weight.

* * * * *